United States Patent [19]

Lerner et al.

[11] Patent Number: 4,758,252

[45] Date of Patent: Jul. 19, 1988

[54] HYDROSTATIC METHOD EMPLOYING PSA VENT GAS PRESSURE FOR VACUUM REGENERATION

[75] Inventors: Steven L. Lerner, Berkeley Heights; Ramachandran Krishnamurthy, Piscataway; Donald L. Maclean, Annandale, all of N.J.

[73] Assignee: The BOC Group, Inc., Montvale, N.J.

[21] Appl. No.: 66,446

[22] Filed: Jun. 26, 1987

[51] Int. Cl.$^4$ .............................................. B01D 53/04
[52] U.S. Cl. ............................................ 55/25; 55/58; 55/70; 55/73; 55/75; 55/179; 55/189; 55/389
[58] Field of Search ...................... 55/55, 58, 179, 189, 55/389, 68, 70–73, 25, 26, 62, 75; 417/119, 150, 395

[56] References Cited

U.S. PATENT DOCUMENTS

| | | | |
|---|---|---|---|
| 297,433 | 4/1884 | Neveux | 417/150 X |
| 361,174 | 4/1887 | Maxwell et al. | 417/150 |
| 1,799,591 | 4/1931 | Kiefer | 417/150 X |
| 2,944,627 | 7/1960 | Skarstrom | 55/58 X |
| 3,696,588 | 10/1972 | Dussourd et al. | 55/189 X |
| 3,801,513 | 4/1974 | Munzner et al. | 55/75 X |
| 3,829,246 | 8/1974 | Hancock | 417/150 X |
| 3,834,136 | 9/1974 | Dussourd et al. | 55/189 X |
| 3,934,989 | 1/1976 | Haugen | 55/189 X |
| 3,960,522 | 6/1976 | Munzner et al. | 55/68 |
| 4,093,544 | 6/1978 | Ross | 55/70 X |
| 4,340,398 | 7/1982 | Doshi et al. | 55/58 X |
| 4,378,978 | 4/1983 | Andersson et al. | 55/189 X |
| 4,407,665 | 10/1983 | Lasater | 55/55 |
| 4,415,340 | 11/1983 | Knoblauch et al. | 55/58 X |
| 4,508,549 | 4/1985 | Beppu et al. | 55/189 X |
| 4,534,346 | 8/1985 | Schlaechter | 55/58 X |

FOREIGN PATENT DOCUMENTS

| | | | |
|---|---|---|---|
| 2906057 | 8/1980 | Fed. Rep. of Germany | 55/58 |
| 3303420 | 8/1984 | Fed. Rep. of Germany | 55/189 |
| 2329597 | 7/1977 | France | 55/189 |
| 132618 | 10/1980 | Japan | 55/189 |

*Primary Examiner*—Robert Spitzer
*Attorney, Agent, or Firm*—R. Hain Swope; Chris P. Konkol; Larry R. Cassett

[57] ABSTRACT

This invention relates to an energy efficient method of vacuum regenerating an adsorbent bed. In a typical process, the adsorbent bed undergoes an adsorption step, a vent step, and a vacuum purge step. According to the present invention, the energy of the usually discarded vent gas is used to raise a dense liquid from a lower tank to a higher tank. The potential energy of the raised liquid, upon returning from the higher tank to the lower tank, is used to generate a vacuum for vacuum regeneration of the adsorbent bed.

8 Claims, 4 Drawing Sheets

| TIME (SEC) VALVE POSITION | | 10 | 95 | 40 | 15 | 10 | 95 | 40 | 15 |
|---|---|---|---|---|---|---|---|---|---|
| FEED TO BED A | 01 | | ▨ | ▨ | | | | | |
| FEED TO BED B | 02 | | | | | | ▨ | ▨ | |
| BOTTOM BALANCE | 03 | ▨ | | | | | | | |
| BOTTOM BALANCE | 04 | | | | | ▨ | | | |
| VENT LINE TO L.W.C. | 05 | | | ▨ | ▨ | | | | |
| VENT TO ATM. | 06 | | | ▨ | ▨ | | | ▨ | ▨ |
| BED A TO VENT LINE | 07 | | | | ▨ | | | | |
| BED B TO VENT LINE | 08 | | | ▨ | | | | | |
| VENT LINE TO U.W.C. | 09 | | | | | | | ▨ | ▨ |
| TOP BALANCE | 10 | ▨ | | | | | | | |
| TOP BALANCE | 11 | | | | | ▨ | | | |
| U.W.C. TO ATM. | 12 | | | | | | | | ▨ |
| U.W.C. TO VENT LINE | 13 | | | ▨ | | | | | |

FULL CYCLE SEQUENCE

OPEN    CLOSED

HYDROSTATIC METHOD EMPLOYING PSA VENT GAS PRESSURE FOR VACUUM REGENERATION

BACKGROUND OF THE INVENTION

For many pressure swing adsorption (PSA) separations, vacuum regeneration of the one or more adsorbent beds will significantly improve PSA process performance. The major drawback of vacuum regeneration, however, has been the high energy costs associated with the generation of a vacuum. The present invention eliminates or reduces this problem by using the energy available in the usually discarded vent gas to create a source of vacuum. In particular, the relatively high pressure of the vent gas is used to transfer a portion of dense liquid from a lower tank to a higher tank. When this same portion of dense liquid is returned to the lower tank, a vacuum is created which can be used to regenerate an adsorbent bed.

In the following description of the invention, the term "pressure swing adsorption" or its acronym "PSA" is used in reference to a type of process and apparatus that is now well known and widely used with respect to separating the components of a gaseous mixture. A PSA system basically comprises passing a feed gas mixture through one or more adsorption beds containing a sieve material which has a greater selectivity for a more strongly adsorbed component than a more weakly adsorbed component of the gas mixture. In the operation of a typical 2-bed PSA system, the connecting conduits, valves, timers, and the like are coordinated and arranged so that when adsorption is occurring in a first bed, regeneration is occurring in a second bed. In the usual cycle, sequential steps with respect to each bed include bed pressurization, product release and venting. Basic PSA systems are described in U.S. Pat. Nos. 2,944,627, 3,801,513, and 3,960,522.

Various modifications and improvements to the basic PSA process and apparatus have been described in various patents, for example, in U.S. Pat. No. 4,415,340, issued on Nov. 15, 1983 and U.S. Pat. No. 4,340,398 issued on July 20, 1982. The present invention is not limited to the use of any particular PSA process or apparatus design.

Venting an adsorbent bed is the simplest method of regenerating a PSA bed for further adsorption. Other combined modes of regeneration which are conventionally used to improve the regeneration step include (i) regeneration at atmospheric pressure coupled with product purge, and (ii) vacuum regeneration. An advantage of product purge is that relatively low energy is required for regeneration. A disadvantage of product purge is that a relatively low product yield is obtained as a result of the loss of the product purge gas itself.

The yield obtained using vacuum regeneration is generally superior to the yield using product purge. Vacuum regeneration, however, increases the capital investment for the process slightly and the energy requirement appreciably. Consequently, it has been necessary to weigh the increase in product yield that results with vacuum regeneration against the incremental cost that is primarily associated with energy charges. It would therefore be desirable to reduce the energy requirements of vacuum regeneration in order to more fully benefit from the superior yields associated with vacuum regeneration.

It is therefore an object of the present invention to increase the yield of a PSA system by using vacuum regeneration, while reducing the high energy costs typically associated with vacuum regeneration relative to other modes of regeneration.

It is a further object of the present invention to harness the energy of the usually discarded vent gas in a PSA process to create a potential source of energy for creating a vacuum.

It is yet a further object of the invention to use the vent gas pressure in a PSA process to transfer a dense liquid from a lower tank to a higher tank and, furthermore, to create a source of vacuum by returning the transferred liquid back to the lower tank which is subsequently utilized while the higher tank is in communication with the adsorbent bed.

DETAILED DESCRIPTION OF THE INVENTION

The invention is directed to an improved method of accomplishing vacuum regeneration of an adsorbent bed. In particular, following the adsorption step in a PSA cycle, an adsorbent bed is vented and the vent gas stream is used to transfer a dense liquid to a greater height. The potential energy of this liquid, upon returning to its former lower position, is used to create a vacuum for vacuum regeneration.

Figure 1:
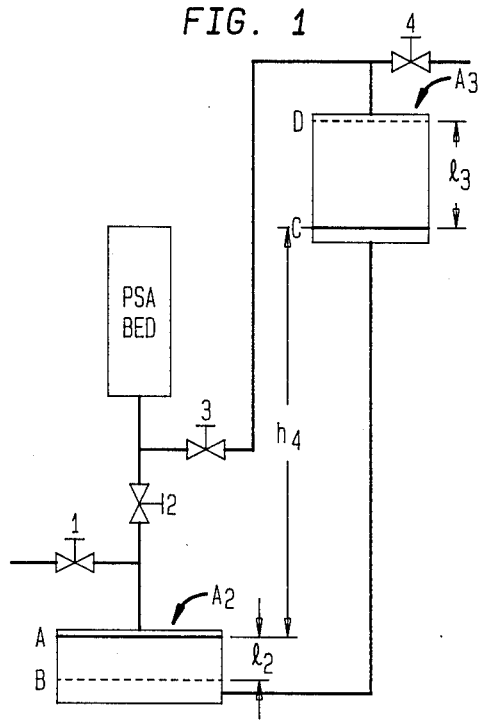
FIG. 1 is a diagram of a one-bed system according to the present invention, wherein the PSA vent gas pressure is employed to provide energy for vacuum regeneration.

A preferred embodiment of the invention is shown in FIG. 1. The invention consists of two tanks that are initially filled with fluid to levels A and C, respectively. The tanks are connected to each other and the PSA bed as shown, with valves 1, 2, 3 and 4 for on-off flow control. Initially, valves 1, 2 and 3 are closed and valve 4 is open. To initiate venting of the bed, valve 2 is opened and the liquid levels in the tanks change from A to B through a distance $l_2$ and C to D through a distance $l_3$, respectively. When the liquid levels stop moving, valve 4 is closed, valve 1 is opened, and the bed continues to vent until it reaches atmospheric pressure. Vacuum regeneration is then applied by closing valve 2 and opening valve 3. A vacuum is created in the bed as the liquid levels in the tanks return to their original positions and the gas volume above the liquid in the higher tank increases. It is desirable that the liquid levels return to their initial positions to have an easily controllable cyclic process; this is achieved principally by correctly selecting the cross-sectional areas, $A_2$ and $A_3$ of the two tanks and the initial height difference by between A and C.

Figure 2:
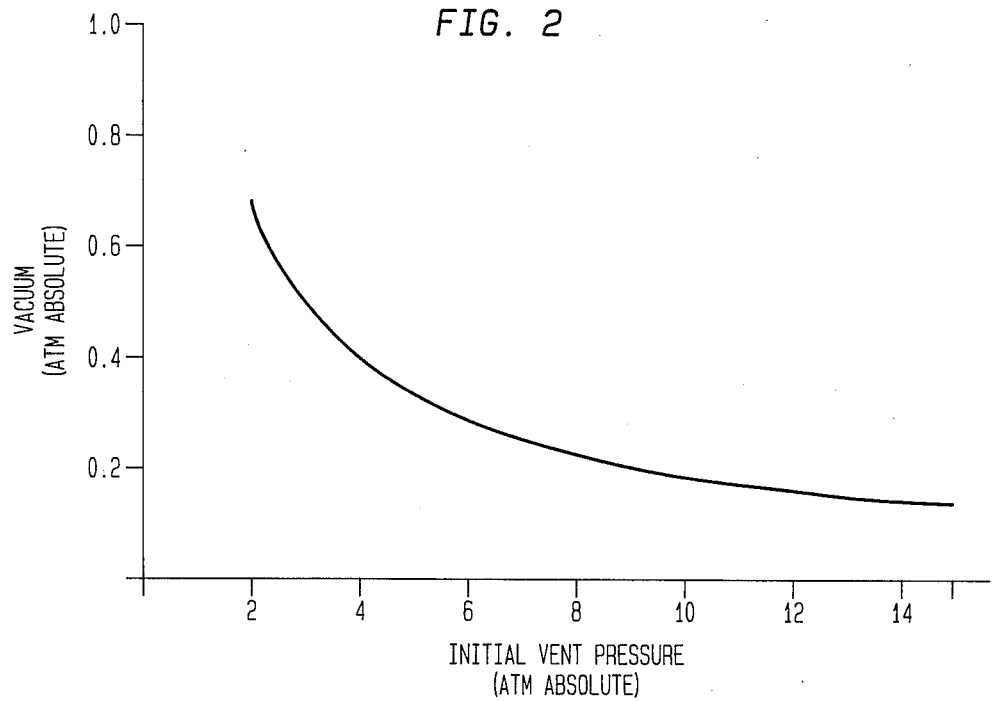
FIG. 2 is a graph showing the relationship of available vacuum pressure to the initial vent pressure.

As the initial vent pressure increases, a better vacuum is obtained. Good vacuum regeneration however, can be obtained at even moderate initial vent pressures. The vacuum pressure optimally capable of being produced is shown in FIG. 2 as a function of the initial vent pressure.

The liquid used in the tanks is suitably water, which is an economical and non-toxic liquid of relatively high density. However, it will be apparent to those of ordinary skill in the art, that other liquids, capable of generating the necessary hydrostatic pressure, can be employed.

The important parameters that affect the design of the hydrostatic method are: (i) the height between the lower and higher water columns, (ii) size of the water columns, and (iii) area of cross-section of the water columns.

A minimum height of 33.9 feet is required to produce a theoretical vacuum of 14.7 psi with water as a medium. Use of dense fluids such as mercury reduces the height requirement but at the expense of increased cost of materials and increased safety and environmental concerns.

The size of a water column is dictated by the volume of gas that is released by the bed from the bed equalization pressure when it is depressurized into the lower water column and the volume of gas that is removed from the bed by evacuation. Too large a water column will result in very little movement of the water level and too small a water column is not capable of bed evacuation. An appropriate size of the water columns can be empirically determined by measuring the amount of preferentially adsorbed gas released from a specified high pressure to a low pressure as well as from atmospheric condition to a required level of vacuum. For oxygen PSA, the ideal water column size is close to the size of the adsorption bed.

The area of cross-section of the lower water column affects the time taken for moving the water level, during bed depressurization, into the lower column. A larger area of cross-section of the lower water column minimizes the time and is preferred.

It will be further appreciated that the system of the present invention may be supplemented by an automatic control device to ensure that the proper pressures are maintained in a cyclical operation. For example, a pressure transducer or a level indicator in the higher or lower tank can be employed to monitor the system and a source of pressure in communication with one of the tanks can be activated in the event of a deviation from the programmed pressure or level set point of an automatic controller. It will be further appreciated that the vacuum produced by the system of the present invention may be supplemented by a conventional mechanical pump. The amount of energy required by such a pump will be less than otherwise required to produce the amount of vacuum regeneration achieved by the present invention.

EXAMPLE 1

An adsorption PSA bed with dimensions 7.8 ft. tall and 1.6 ft.$^2$ cross-section area, containing carbon molecular sieve of an average diameter of 1.5 mm and a bed void volume of 5 ft$^3$ was connected to a higher and lower tank as shown in FIG. 1. The tanks were 12 ft. high and each had a square cross-sectional area of 1.6 ft$^2$. The height of the liquid level in the higher tank was 13.6 ft. with respect to the liquid level in the lower tank.

The PSA bed was operated according to a conventional adsorption-vent-purge cycle. The pressure in the PSA bed just prior to initiation of the vent portion of the cycle was 5.0 atmospheres. The pressure in the bed at the end of the vent was 2 atmospheres and the vacuum pressure in the bed was found to be 0.4 atmosphere. The overall capacity for change in the liquid level in the lower tank was 9.6 feet.

EXAMPLE 2

Figure 3:
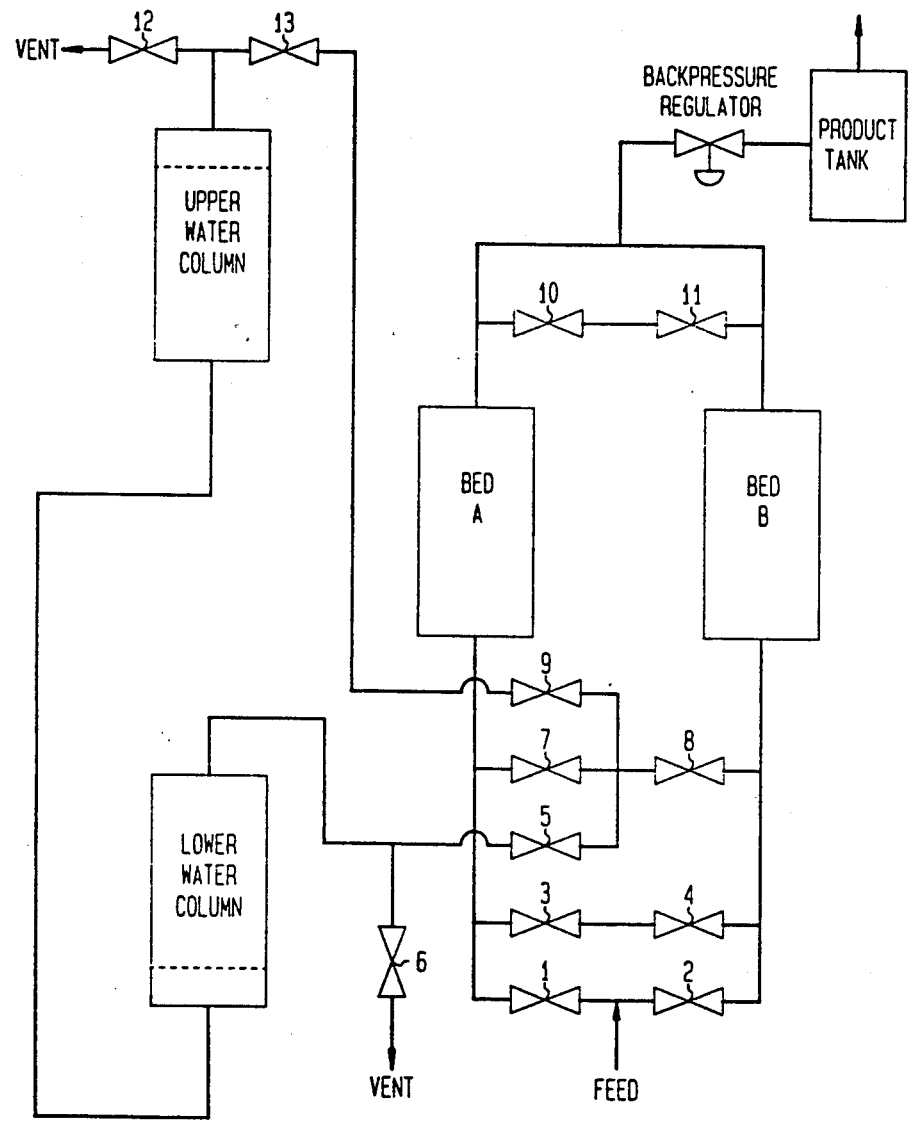
FIG. 3 is a diagram of a two-bed system according to the present invention, wherein the PSA vent gas pressure is employed to provide energy for vacuum regeneration.
Figure 4:
FIG. 4 is a diagram showing the valve positions during a full cycle sequence using the two-bed system shown in FIG. 3.
Figure 4:

The hydrostatic method for bed evacuation was tested on a 2-bed PSA process to produce oxygen enrichment of air. Compressed air was fed into a bed containing zeolite adsorbent (5A type) which preferentially adsorbs nitrogen. The primary high pressure product is oxygen rich whereas the low pressure vent gas (secondary product) is nitrogen rich. A schematic representation of a 2-bed hydrostatic PSA apparatus is shown in FIG. 3. A process cycle sequence is shown in Table 1 and the opening and closing of valves during a full cycle is depicted in FIG. 4.

TABLE 1

| | Hydrostatic 2-Bed PSA Sequence | | |
|---|---|---|---|
| Step No. | Bed "A" | Bed "B" | Valves Open |
| 1 | Bed balance | Bed balance | 3, 4, 10, 11 |
| 2 | Feed pressurize | Vent to L.W.C. Open H.W.C. to atm | 1, 5, 8, 12 |
| 3 | Feed + produce | Vent to atm Isolate H.W.C. Vent L.W.C. to atm | 1, 5, 6, 8 |
| 4 | Feed + produce | Open to H.W.C. (Vacuum Regeneration) Vent to L.W.C. to atm | 1, 6, 8, 9, 13 |
| 5 | Bed balance | Bed balance | 3, 4, 10, 11 |
| 6 | Vent to L.W.C. Open H.W.C. to atm | Feed pressurize | 2, 5, 7, 12 |
| 7 | Vent to atm Isolate H.W.C. Vent L.W.C. to atm | Feed + produce | 2, 5, 6, 7 |
| 8 | Open to H.W.C. (Vacuum Regeneration) Vent L.W.C. to atm | Feed + produce | 2, 6, 7, 9, 13 |

Key:
L.W.C. — Lower water column
H.W.C. — Higher water column

Figure 5:
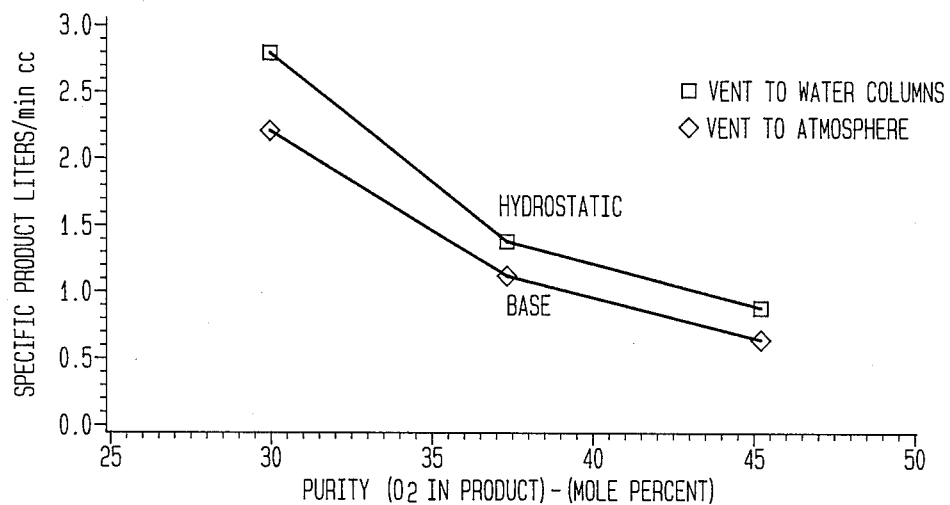
FIG. 5 is a graph of purity versus specific product in a process according to the present invention.
Figure 6:
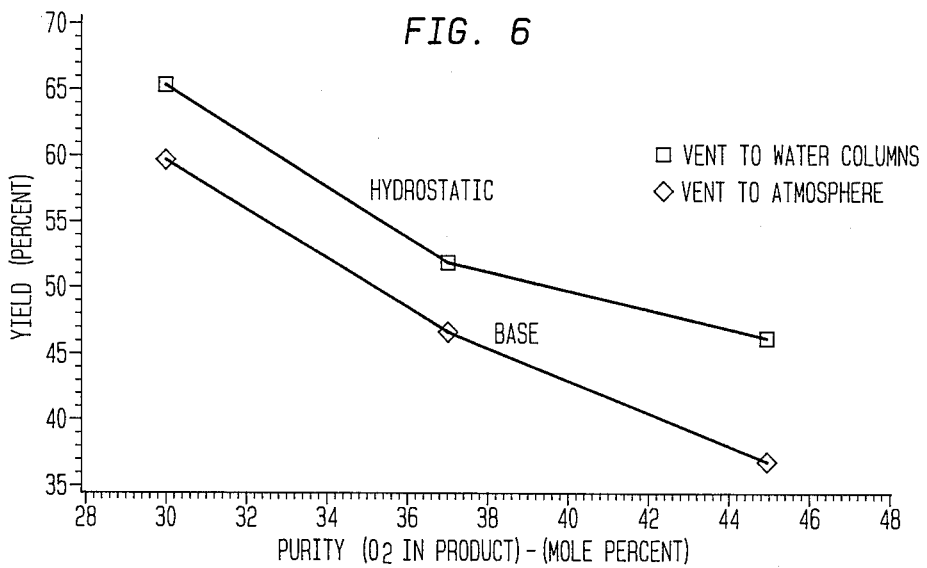
FIG. 6 is a graph of purity versus yield in a process according to the present invention.

The hydrostatic method was compared against a basic 2-bed PSA process cycle consisting of bed pressurization and production, bed pressure equalization and depressurization (vent) to atmospheric pressure. The two process cycles were operated to produce oxygen of a given purity by adjusting production rate and the yield and specific product were measured. This was carried out at different PSA operating pressures. For an operating pressure of 85 psig, the relationship between yield and purity for the two processes is shown in FIG. 5. FIG. 6 shows the relationship between the specific product and purity at the same pressures. FIG. 4 demonstrates that the hydrostatic method leads to at least 4.7 (and as much as 9.8) percentage points higher oxygen yield, that being achieved at no energy expenditure. FIG. 6 demonstrates that the higher yield is not achieved at the expense of a lower specific production rate. In fact, the hydrostatic method operates at a 20 to 34 percent higher specific product rate, realized through a larger pressure differential between adsorption and desorption conditions.

The present invention is applicable to any PSA system, including any number of PSA beds, employing vacuum regeneration. Exemplary processes include, but are not limited to, argon recovery from ammonia plants, carbon dioxide separation from landfill gas, and oxygen separation from air.

Although the invention has been described with a certain degree of particularity, various changes can be made to it without departing from the spirit and scope of the invention as described and hereafter claimed.

We claim:

1. A process of regenerating an adsorption bed following the adsorption stage of a pressure swing adsorption cycle comprising the following steps:
   (i) venting an adsorbent bed to atmospheric pressure, the vent gas stream being directed to a first tank containing a liquid causing the level of the liquid to be lowered and at least a portion of said liquid to be transferred via a conduit to a second tank positioned at a greater height than said first tank; and
   (ii) regenerating said adsorbent bed by permitting pressure equalization between said adsorbent bed initially at atmospheric pressure and the upper portion of said second tank above the level of liquid contained therein, while disconnecting said adsorbent bed from said first tank, such that the liquid level in said second tank is lowered and a portion of said liquid is transferred via a conduit to said first tank, thereby achieving a vacuum in said adsorbent bed.

2. The process of claim 1, wherein the portion of liquid transferred to said second tank is equal to the portion of liquid subsequently transferred back to said first tank.

3. The process of claim 1, wherein steps (i) and (ii) are repeated in a cyclical operation.

4. The process of claim 1, wherein further vacuum is provided in said adsorbent bed by a mechanical pump means.

5. A pressure swing adsorption system employing vacuum regeneration, comprising at least one adsorbent bed adapted to communicate through a first conduit with a first tank containing a non-toxic liquid, and wherein said adsorbent bed is adapted to communicate through a second conduit with the upper portion of a second tank, and wherein the bottom portion of said first tank is adapted to communicate through a third conduit with the bottom portion of said second tank, and wherein said second tank is at a sufficiently high altitude with respect to said first tank so that when said liquid in said first tank is transferred to said second tank, a potential energy is developed which is capable of providing a vacuum in said adsorbent bed when said liquid is returned to said first tank while the upper portion of said second tank is in communication with said adsorbent bed.

6. The system of claim 5, wherein said liquid is water.

7. The system of claim 1, further comprising a first valve positioned in said first conduit between said adsorbent bed and said first tank and a second valve positioned in said second conduit between said adsorbent bed and said second tank, said first and second valves adapted for independent control.

8. The system of claim 7, further comprising a third valve positioned in a conduit adapted to permit communication between said first tank and a locale at ambient pressure and a fourth valve positioned in a conduit adapted to permit communication between said second tank and the same or a different locale at ambient pressure.

* * * * *